United States Patent

Dombrovski et al.

Patent Number: 6,054,788
Date of Patent: Apr. 25, 2000

[54] MAGNETIC POWER TRANSMISSION COUPLING

[75] Inventors: Viatcheslav Dombrovski, Willoughby Hills, Ohio; Suresh Tirumalai, Simpsonville, S.C.; Ira Goldberg, Thousand Oaks, Calif.; David Driscoll, South Euclid, Ohio

[73] Assignee: Reliance Electric Industrial Company, Milwaukee, Wis.

[21] Appl. No.: 09/133,147

[22] Filed: Aug. 12, 1998

[51] Int. Cl.⁷ .......................... H02K 49/00; H02K 49/06; H02K 49/02; H02K 49/10
[52] U.S. Cl. .......................................... 310/103; 310/75 D
[58] Field of Search .................................... 310/103, 105, 310/75 D

[56] References Cited

U.S. PATENT DOCUMENTS

| | | | |
|---|---|---|---|
| 896,868 | 8/1908 | Steckel | 310/105 |
| 1,186,851 | 6/1916 | Severy | 310/105 |
| 1,962,659 | 6/1934 | Kautz | 310/103 |
| 2,132,573 | 10/1938 | McDonald | 242/362 |
| 2,470,249 | 5/1949 | Karasick | 310/105 |
| 2,487,416 | 11/1949 | Bessiere | 310/93 |
| 2,488,079 | 11/1949 | De Lavaud et al. | 310/105 |
| 2,519,882 | 8/1950 | Bullard et al. | 310/93 |
| 2,536,207 | 1/1951 | Norman | 310/94 |
| 2,566,743 | 9/1951 | Okulitch et al. | 310/104 |
| 2,607,820 | 8/1952 | Judd et al. | 310/93 |
| 2,717,743 | 9/1955 | Eames | 242/362.2 |
| 2,722,617 | 11/1955 | Cluwen et al. | 310/103 |
| 2,754,438 | 7/1956 | Zozulin et al. | 310/105 |
| 2,768,316 | 10/1956 | Neiss | 310/95 |
| 2,810,349 | 10/1957 | Zozulin | 310/105 |
| 2,824,244 | 2/1958 | Zozulin | 310/96 |
| 2,902,612 | 9/1959 | Whearley | 310/105 |
| 2,971,105 | 2/1961 | Jaeschke | 310/105 |
| 3,049,636 | 8/1962 | Stadelmann | 310/97 |
| 3,382,385 | 5/1968 | Baudot | 310/94 |
| 3,403,275 | 9/1968 | Little | 310/103 |
| 3,488,535 | 1/1970 | Baermann | 310/105 |
| 3,555,321 | 1/1971 | Gruener et al. | 310/93 |
| 3,573,517 | 4/1971 | Osterstrom | 310/103 |
| 3,584,250 | 6/1971 | Bottani | 310/98 |
| 3,763,968 | 10/1973 | Noly | 310/77 |
| 3,764,836 | 10/1973 | Bender et al. | 310/98 |
| 3,811,740 | 5/1974 | Sacerdoti et al. | 310/90.5 |
| 3,822,390 | 7/1974 | Janson | 310/104 |
| 3,936,683 | 2/1976 | Walker | 310/103 |
| 3,974,408 | 8/1976 | Fehr et al. | 310/103 |
| 4,115,040 | 9/1978 | Knorr | 310/104 |
| 4,152,617 | 5/1979 | Janson | 310/103 |
| 4,826,150 | 5/1989 | Minoura | 310/103 |
| 4,856,631 | 8/1989 | Okamoto et al. | 192/21.5 |
| 5,105,928 | 4/1992 | Saeki et al. | 310/103 |
| 5,204,572 | 4/1993 | Ferreira | 310/156 |
| 5,447,093 | 9/1995 | Budzich | 91/446 |
| 5,447,094 | 9/1995 | Geyler, Jr. | 91/520 |
| 5,473,209 | 12/1995 | Lamb | 310/75 D |
| 5,477,093 | 12/1995 | Lamb | 310/75 D |
| 5,477,094 | 12/1995 | Lamb | 310/75 D |
| 5,668,424 | 9/1997 | Lamb | 310/103 |
| 5,691,587 | 11/1997 | Lamb | 310/103 |
| 5,739,627 | 4/1998 | Lamb | 310/103 |

FOREIGN PATENT DOCUMENTS 682124   11/1952   United Kingdom .

Primary Examiner—Clayton LaBalle
Attorney, Agent, or Firm—Lloyd G. Farr; John J. Horn; Alex M. Gerasimow

[57] ABSTRACT

A magnetic coupling is provided having a first shaft and a second shaft. A plurality of first magnets is in rotationally driving engagement with the first shaft and defines alternating polarity magnetic surfaces. A plurality of second magnets is in rotationally driving engagement with the second shaft and defines alternating polarity magnetic surfaces. The first and second magnet surfaces are separated by a gap so that rotation of one of the first magnets and second magnets urges synchronous rotation of the other. An electrically conductive member is in rotationally driving engagement with the second shaft and is disposed proximate to the first magnet surfaces so that rotation of the conductive member or the first magnets relative to the other induces electric current in the conductive member and urges asynchronous rotation of the other of the conductive member and the first magnets in the same rotational direction.

42 Claims, 5 Drawing Sheets

MAGNETIC POWER TRANSMISSION COUPLING

BACKGROUND OF THE INVENTION

Magnetic couplings are used to apply rotational torque from an input shaft to an output shaft. Synchronous magnetic couplings typically include opposing sets of magnets disposed on respective rotors rotationally fixed to the input and output shaft. The rotors may be configured in a variety of suitable arrangements, for example comprising concentric disks defining transverse surfaces upon which the magnets are annularly disposed so that the input shaft magnets are separated from the output shaft magnets by an axial gap. In another possible configuration, one of the rotors may define an outer circumferential surface radially separated from an inner circumferential surface of the opposing rotor. The respective magnets are disposed annularly about these circumferential surfaces so that a radial gap is established between them.

Both sets of magnets are arranged so that magnet surfaces are defined at the gap in alternating polarity. If the rotors are turned so that magnet surfaces of the same polarity oppose each other across the gap, the opposing magnets repulse each other. As the rotors are rotated relative to one another, magnets of opposite polarity attract each other, reaching a maximum attraction when opposite poles are directly in line with each other across the gap. If there is no load on either shaft, therefore, the rotors tend to align themselves in this position.

When the input shaft is driven, for example by a motor, the input shaft rotor applies torque to the output shaft rotor through the magnetic interaction between the opposing magnets. Generally, a first magnet pole on one rotor is aligned between two opposite polarity second poles on the other rotor across the gap. Thus, assuming that the two second magnet poles are on the driving rotor and that the first magnet is on the driven rotor, torque is applied through the attraction and repulsion of the two second magnet poles to the first magnet pole, and the output shaft rotates synchronously. The rotors maintain synchronous rotation until the output shaft's load overcomes the magnetic torque applied between the magnets. At this point, the output rotor begins to slip with respect to the input rotor.

An asynchronous coupling generally includes only one set of magnets (arranged in alternating polarity), for example disposed on the input shaft rotor. An electric conductor is disposed on the output shaft rotor so that the conductor opposes the input rotor magnets across the gap so that magnetic flux of the magnets passes through the conductor. The conductor may comprise an annular ring made of a material such as copper or aluminum and that is concentric with the output shaft. When the input shaft is rotationally driven, the changing magnetic field induces an electric current in the ring, thereby generating magnetic drag that causes the output rotor to rotate with the input shaft, but at a lower speed.

Since the output shaft of the asynchronous coupling slips with respect to the input shaft, it is less efficient than the synchronous coupling. On the other hand, it provides a more gradual, or "softer," start to the output shaft. As should be understood by those skilled in this art, synchronous or asynchronous couplings may be more appropriate in a given system.

SUMMARY OF THE INVENTION

The present invention recognizes and addresses disadvantages of prior art constructions and methods.

Accordingly, it is an object of the present invention to provide an improved magnetic coupling for power transmission.

This object is achieved by a magnetic coupling including a first shaft and a plurality of first magnets in rotationally driving engagement with the first shaft and defining surfaces disposed in alternating polarity annularly about and concentrically with the first shaft. The coupling also includes a second shaft and a plurality of second magnets in rotationally driving engagement with the second shaft. The second magnets define surfaces disposed in alternating polarity annularly about and concentrically with the second shaft. The second magnet surfaces are separated from the first magnet surfaces by a gap so that rotation of one of the first magnets and the second magnets about the axis of the respective first shaft and second shaft urges synchronous rotation of the other of the first magnets and the second magnets about the axis of the respective first shaft and second shaft. An electrically conductive member is in rotationally driving engagement with the second shaft. The conductive member is disposed proximate to the surfaces of the first magnets so that rotation of one of the conductive member and the first magnets relative to the other of the conductive member and the first magnets induces electric current in the conductive member and urges asynchronous rotation of the other of the conductive member and the first magnets in the same rotational direction.

This object is also achieved by a magnetic coupling including a first shaft and a plurality of magnets in rotationally driving engagement with the first shaft and defining surfaces disposed in alternating polarity annularly about and concentrically with the first shaft. The coupling also includes a second shaft and an electrically conductive member in rotationally driving engagement with the second shaft. The conductive member is disposed proximate to the surfaces of the magnets so that rotation of one of the conductive member and the magnets relative to the other of the conductive member and the magnets induces electric current in the conductive member and urges asynchronous rotation of the other of the conductive member and the magnets in the same rotational direction. The conductive member includes a first annular ring disposed concentrically with the second shaft, a second annular ring disposed concentrically with the first annular ring, and a plurality of cross members electrically connecting the first annular ring and the second annular ring.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended drawings, in which.

Figure 1:
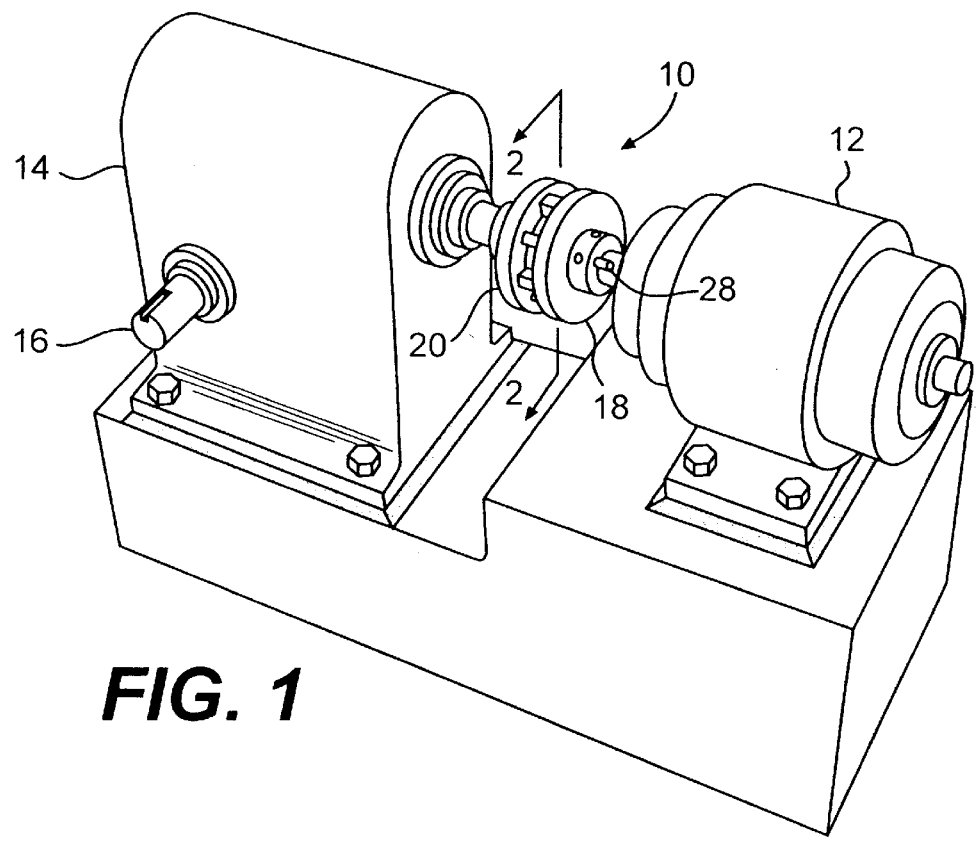
FIG. 1 is a schematic perspective view of an embodiment of a magnetic coupling according to the present invention.

Repeat use of reference characters in the specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
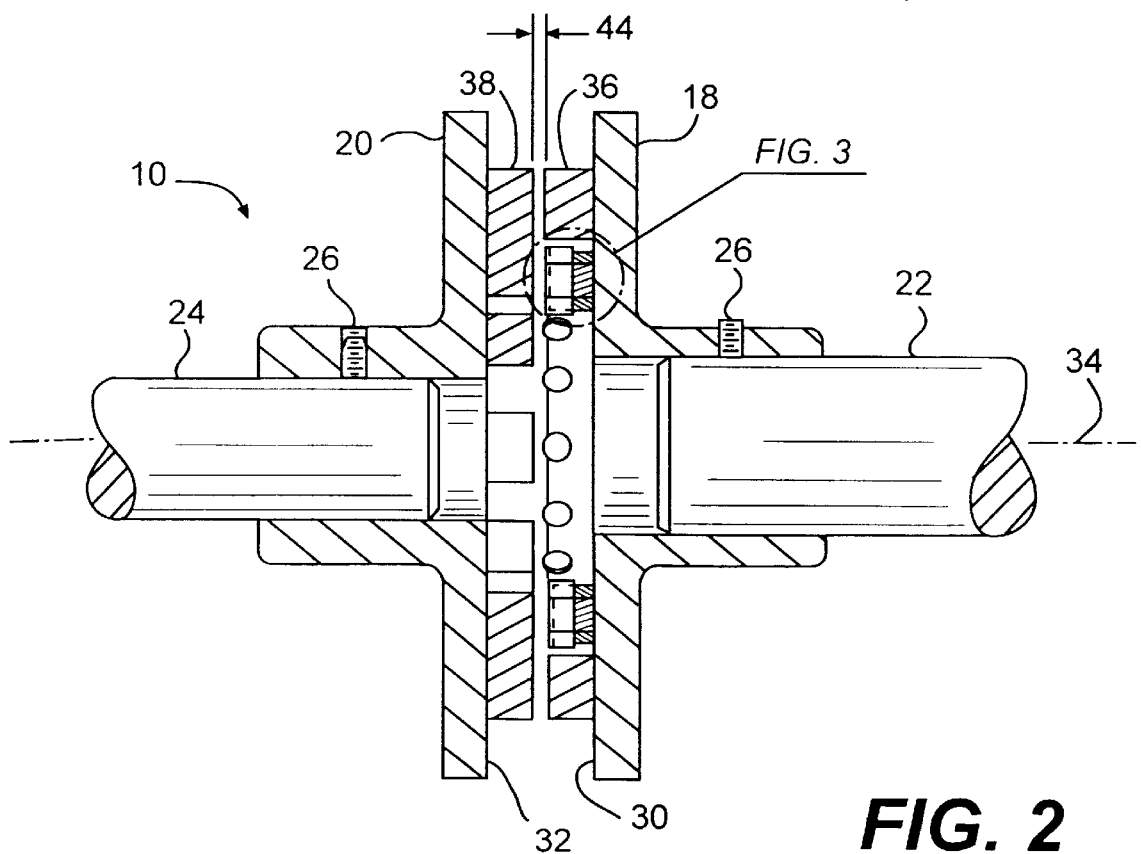
FIG. 2 is a cross-sectional schematic view of the coupling as in FIG. 1 taken along the line 2—2.

FIG. 1 schematically illustrates one embodiment of a magnetic coupling 10 according to the present invention attached to a motor 12 and a gear reducer 14 that drives a load by an output shaft 16. Referring also to FIG. 2, coupling 10 includes a pair of opposing rotors 18 and 20 respectively attached to an output shaft 22 and an input shaft 24 by set screws 26 and keys 28 received by respective slots in the shafts and rotors. The rotors are schematically illustrated, and it should be understood that any suitable rotor configuration to rotationally secure the magnets to their respective shaft may be used.

Figure 4:
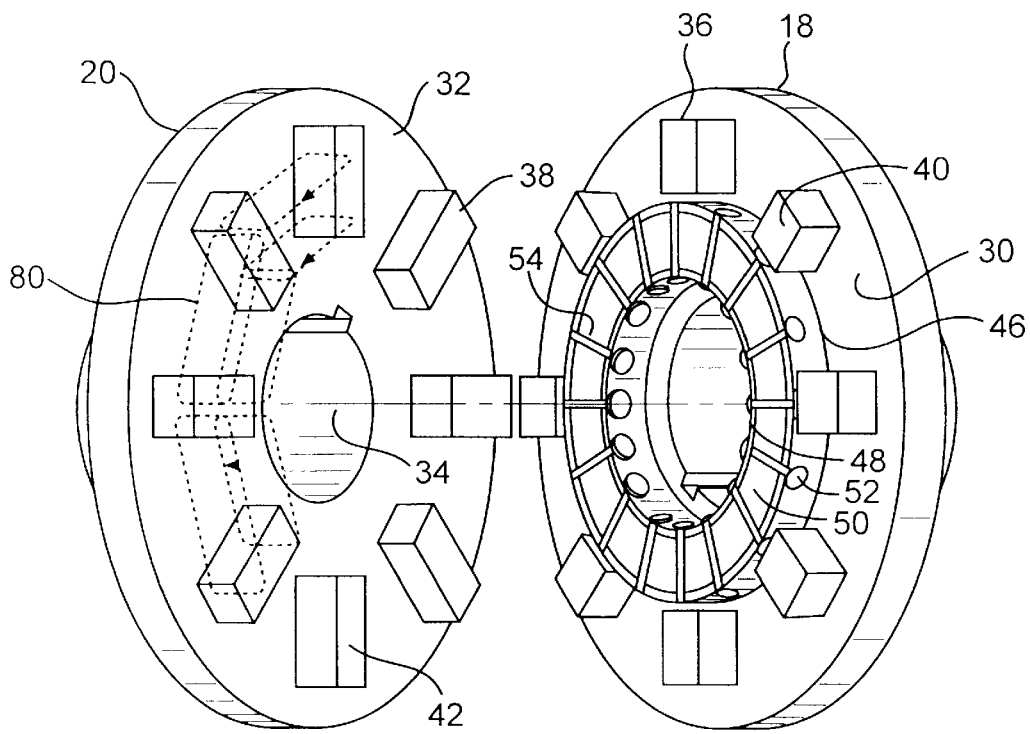
FIG. 4 is a partial exploded view of the coupling as in FIG. 1.

Referring also to FIG. 4, each rotor 18 and 20 defines a respective transverse surface 30 and 32 perpendicular to the axis 34 of output shaft 22 and input shaft 24. A plurality of magnets 36 are annularly disposed about surface 30 while a group of larger magnets 38 is annularly disposed about surface 32. Magnets 36 define surfaces 40 that oppose surfaces 42 of magnets 38 across an air gap 44. As discussed in more detail below, magnetic flux enters and exits gap 44 at the magnet surfaces.

Figure 3:
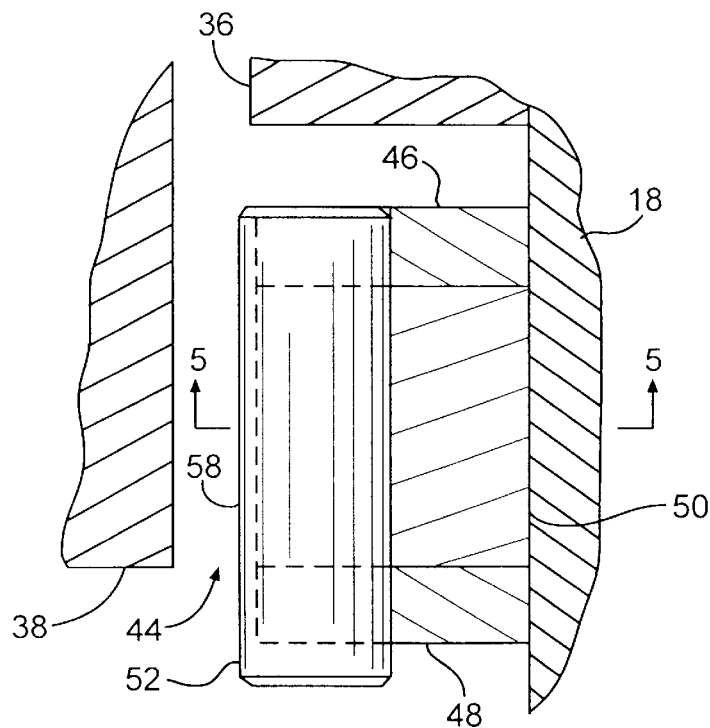
FIG. 3 is an enlarged view of the section as indicated at 3 in FIG. 2.
Figure 5:
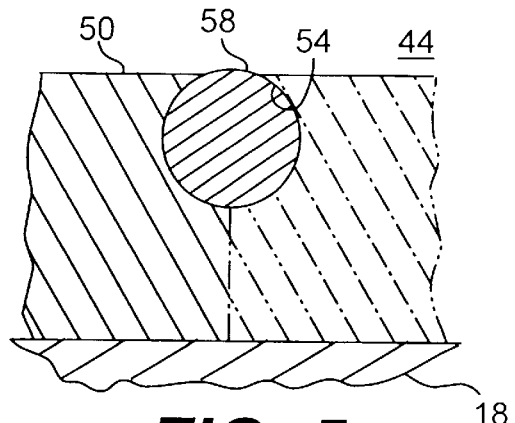
FIG. 5 is a cross-sectional view taken along the line 5—5 in FIG. 3.

An outer conductive ring 46 is disposed radially inward of magnets 36 concentrically with axis 34. A concentric inner conductive ring 48 is separated from ring 46 by an inner ring 50 made of steel or other soft magnetic material. A plurality of electrically conductive cross members 52 electrically connect rings 46 and 48 and extend through channels 54 in steel ring 50. Referring also to FIGS. 3 and 5, channel 54 opens to gap 44 so that a longitudinal outer surface 58 is exposed at gap 44.

It should be understood that the construction described in FIGS. 1–5 is provided for exemplary purposes only and that other suitable arrangements and materials may be employed. For example, while rotors 18 and 20 are constructed from steel, other soft magnetic materials may be used. Further, the rotors and steel ring need not be made from the same material. Thus, while the description provided below is directed to one or more exemplary embodiments, it should be understood that suitable modifications may be made.

Conductive rings 46, 48 and bars 52 are constructed of a non-magnetic material, for example copper or aluminum, that becomes diamagnetic upon application of a changing magnetic field. Magnets 36 and 38 are solid permanent magnets, for example rare earth magnets made of neodymium iron boron or samarium cobalt. The magnets, steel ring and copper rings may be secured to the rotors by bolts, screws, welds, brazes, adhesives or any other suitable mechanism. The magnets and steel ring are preferably attached to minimize or eliminate any magnetic gap between them and the rotor. Bars 52 are attached by brazing and extend slightly inward of ring 48 to facilitate this process.

In one example of the embodiment of FIGS. 1–5, the disk of each rotor 18 and 20 is 0.5 inches thick and has an outer diameter of 7.2 inches and an inner diameter of 1.88 inches. The distance from the radially outer edge of one magnet 36 or 38 to the radially outer edge of its diametrically opposite magnet 36 or 38 is 6.0 inches. Each magnet 38 is 0.75 inches wide, 1.4 inches long and 0.5 inches deep. Each magnet 36 is 0.75 inches wide, 0.75 inches long and 0.5 inches deep.

The outer diameter of ring 46 is 2.13 inches. The inner diameter of ring 48 is 1.49 inches. Each of rings 46 and 48 is 0.12 inches wide, and ring 50 is 0.4 inches wide. Copper rings 46, 48 and steel ring 50 are 0.5 inches deep. Each bar 52 has a 0.25 inch diameter and is 0.75 inches long. The slot in each steel ring channel 54 opening into gap 44 is 0.06 inches across. It should be understood that such dimensions are provided for example only and are not a limitation of the present invention.

Figure 9:
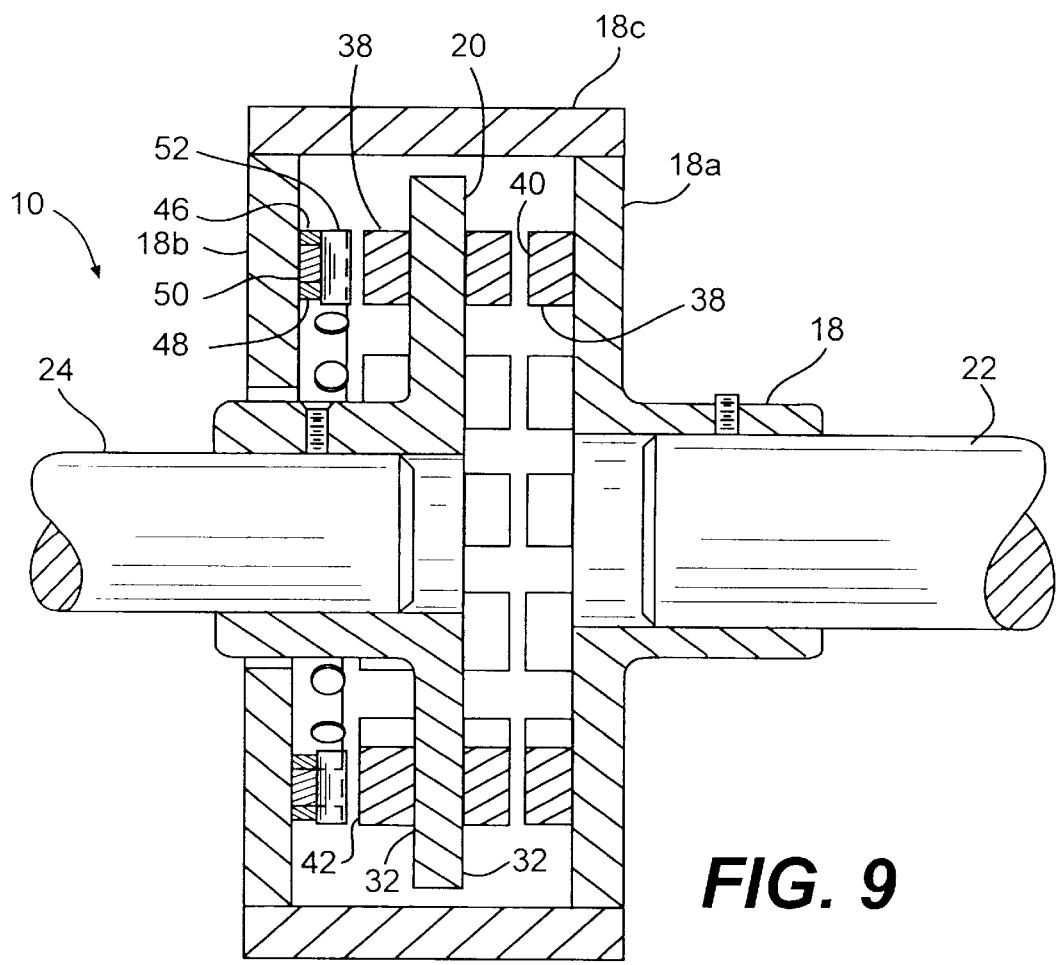
FIG. 9 is a cross-sectional schematic view of an embodiment of a magnetic coupling according to the present invention.

In a second embodiment of the present invention shown in FIG. 9, magnets 38 are disposed on both side surfaces 32 of rotor 20 so that magnet surfaces 42 face in both axial directions. Rotor 18 includes two radially extending, annular soft-magnetic members 18a and 18b and a cylindrical non-magnetic member 18c holding member 18b in position. A series of magnets 38 are disposed on member 18a, and a squirrel cage conductor arrangement as discussed above with respect to FIGS. 1–5 is disposed on member 18b, so that magnet surfaces 40 and conductive bars 52 (along with conductive rings 46, 48 and soft magnetic ring 50) oppose magnet surfaces 42 across two air gaps. The coupling operates similarly to the embodiment of FIGS. 1–5.

Figure 8:
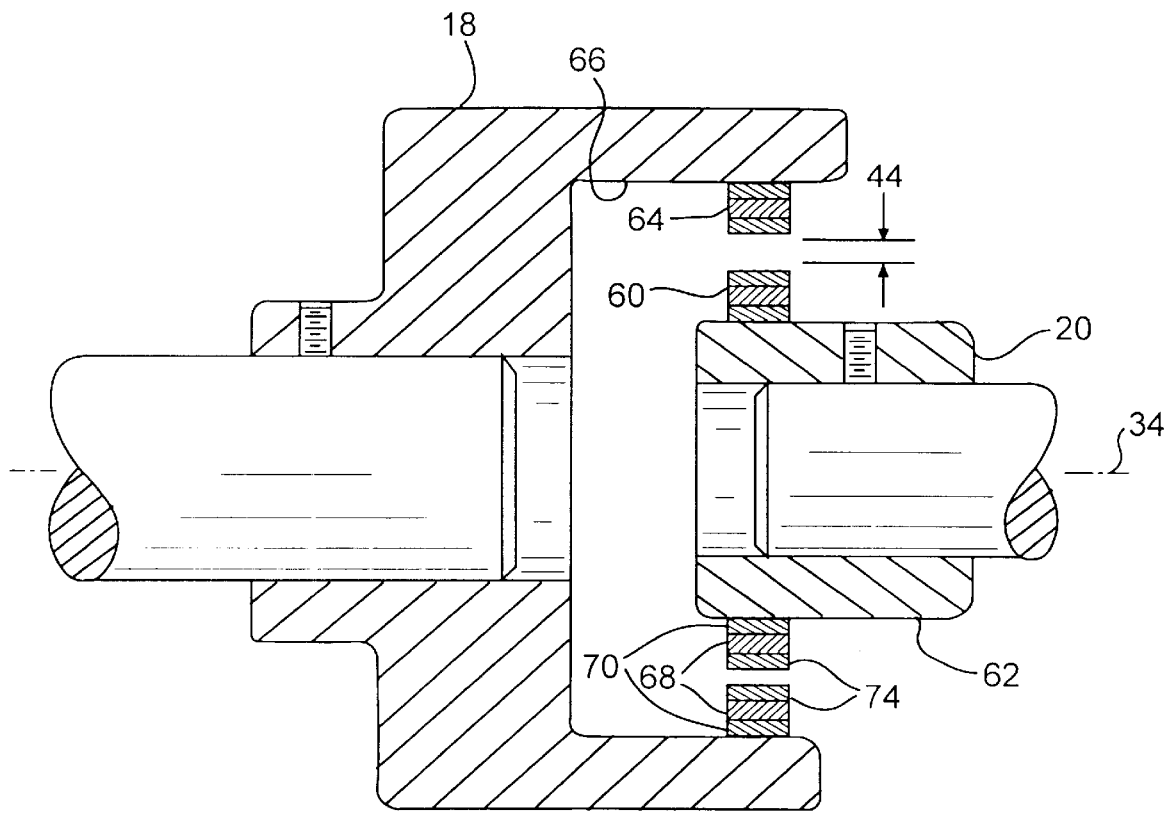
FIG. 8 is a schematic sectional view of a magnetic coupling according to an embodiment of the present invention.

FIG. 8 illustrates a further embodiment of the present invention in which a plurality of magnet groups 60 are annularly disposed about an outer circumferential surface 62 of rotor 20, while an equal number of magnet groups 64 are annularly disposed about an inner circumferential surface 66 of rotor 18. As discussed in more detail below, the number of magnet groups 60 and 64 employed may depend upon the group's construction and dimensions. The groups are spaced apart about the respective rotor circumferential surfaces by the same angular spacing. Thus, it is possible to align the rotors so that one magnet group 60 opposes a corresponding magnet group 64 across air gap 44.

Figure 6:
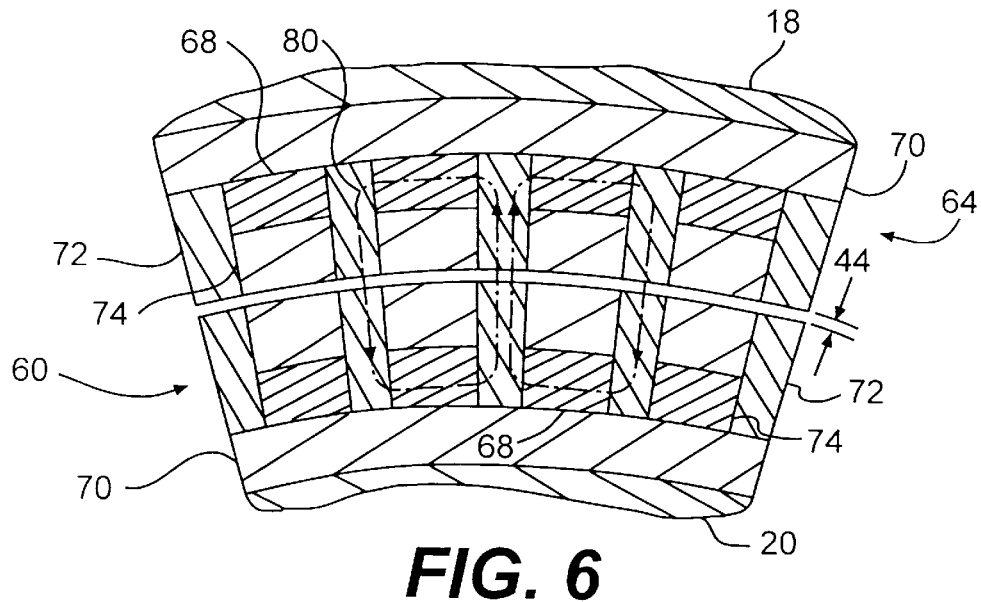
FIG. 6 is a cross-sectional schematic illustration of opposing magnet groups for use within a magnetic coupling of an embodiment of the present invention.

FIG. 6 is a cross section of two opposing magnet groups 60 and 64 taken perpendicularly to the view shown in FIG. 8. Each magnet group includes four magnets 68 disposed on a non-magnetic plate 70 between two side members 72 so that each magnet exhibits a tangentially oriented polarity opposite that of the magnet(s) 68 adjacent to it within the group. A conductive rod 74 sits on each magnet 68 between the side members.

Side members 72 are constructed of a soft magnetic material such as steel. Magnets 68 are relatively weak, for example ceramic, magnets. Conductive bars 74 are made of a non-magnetic material that becomes diamagnetic upon application of a changing magnetic field, for example copper or aluminum.

Figure 7:
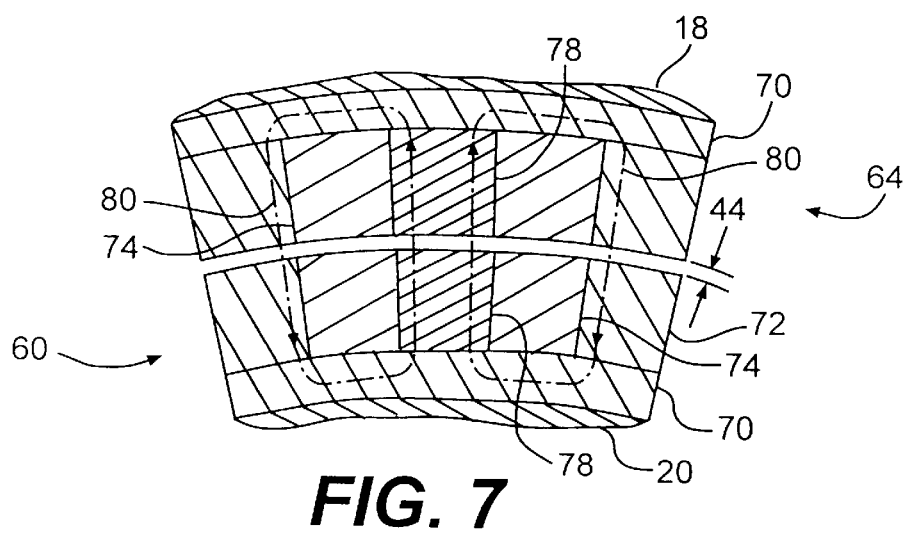
FIG. 7 is a cross-sectional schematic illustration of opposing magnet groups for use within a magnetic coupling of an embodiment of the present invention.

FIG. 7 illustrates an embodiment with a magnet arrangement similar to that shown in FIG. 6. Back plates 70, however, are constructed of a soft magnetic material such as steel, as are side members 72. The longer magnets 78 are stronger than the ceramic magnets of the FIG. 6 embodiment, and their poles are radially aligned. Rare earth magnets may be used. One or more conductive members 74 are again made of a material such as copper or aluminum.

The opposing magnet groups 60 and 64 are disposed on the respective inner and outer circumferences 66 and 62 of rotors 18 and 20 as shown in FIG. 8. A plurality of each magnet group is equiangularly spaced about the respective circumferential surface.

The number of magnets and magnet groups 60 and 64 used in a given system will depend on various factors such as load requirements and cost. For example, while larger, and therefore fewer, magnets may be preferable, cost considerations may dictate smaller magnets in greater number.

As used herein, the term "magnet" refers to a ferromagnetic material that produces a magnetic field inside and outside itself. As should be understood in this art, magnetic material may be "soft" or "hard." Hard magnetic materials independently maintain a magnetic field. Soft magnetic materials become magnetic in the presence of an externally generated magnetic field.

A magnet may be a single piece of material or combination of two or more discrete pieces, for example a combination of hard and soft magnetic pieces. In addition, two or more magnets may share one or more magnetic pieces. Thus, although the term "magnet" is used with respect to certain of the embodiments discussed herein to describe a combination of magnetic pieces that produces two magnetic surfaces of opposite polarity, it should be understood that this is not intended to limit the present invention.

For example, adjacent magnets 38 in FIG. 4 are oriented in opposite polarity with respect to each other on the steel disk of rotor 20. Because steel is a soft magnetic material, it conducts magnetic flux. Flux may also be conducted across the air gap between circumferentially adjacent magnets when the rotors are separated as shown in FIG. 4, thereby creating the flux patterns 80. Thus, flux exiting one magnet surface 42 divides and is drawn to the two adjacent magnet surfaces. Flux entering these adjacent magnets travels through the magnet bodies, through the steel rotor disk and back to the original magnet to complete the magnetic circuit. A similar pattern can be described with respect to magnets 36 of rotor 18.

The air gap 44 (FIG. 2) is much narrower, for example 0.125 to 0.25 inches, than the distance between circumferentially adjacent magnets on the rotors. Thus, in the operative arrangement as shown in FIG. 2 where opposite polarity surfaces of magnets 38 and 36 oppose each other across gap 44, the magnetic forces of the opposing magnets interact so that the flux patterns 80 (FIG. 4) include both sets of magnets and both rotors. For example, flux exiting one magnet surface 42 crosses air gap 44 and enters the opposing magnet 36 at the opposite polarity surface 40. Passing through the magnet 36, the flux divides in steel rotor 18 toward the two circumferentially adjacent magnets 36, passes through these magnets, crosses gap 44 to the opposing magnets 38, passes through these magnets to steel rotor 20, and travels back to the original magnet 38 to complete the circuit. The flux patterns alternately change directions as indicated in FIG. 4. A similar flux pattern exists between adjacent magnets 38 and steel ring 50, although the flux lines may or may not extend down into the rotor.

Accordingly, circumferentially adjacent magnets 38 may be considered side members of a U-shaped magnet in which the section of rotor 20 extending between the magnets is the cross member. Each U-shaped magnet defined by a flux path therefore has two magnet surfaces of opposite polarity, and each shares a side member and a magnet surface with its adjacent U-shaped magnet. The same analysis applies to magnets 36 on rotor 18. Thus, while there are eight magnets 36 and eight magnets 38 shown in FIG. 4, these magnets may also be considered to form eight U-shaped magnets on each rotor.

There is a strong interaction between magnets 36 and 38. Thus, rotation of input shaft 24 applies rotational torque to output shaft 22. The shafts synchronously rotate as long as the load on output shaft 22 does not overcome the rotational holding ability of the magnetic interaction. The maximum torque is produced when the offset between magnets across the gap is some fraction of the pole pitch. This fraction in a given embodiment may depend on the percentage of the pole pitch occupied by the magnet surfaces (for example between 50%–80%), but is at most about one-half. The magnitude of the maximum torque depends upon the coercive force of the permanent magnets, their thickness with respect to the air gap width and on the area of the magnetic pole surfaces.

When the load exceeds this limit, rotors 18 and 20 slip with respect to each other. Thus, there is relative rotation between magnets 36 and 38 and between magnets 38 and rings 46, 48 and copper bars 52. This rotation creates a changing magnetic field between the rotors that creates hysteresis losses in the magnets and eddy currents in the conductors. The hysteresis losses depend on the magnetic flux density magnitude and frequency. The eddy currents are proportional to the square of the magnetic frequency and, therefore, the slip speed. Eddy currents flow through the bars perpendicularly to the magnetic field lines. The copper rings electrically connect the bar ends to carry the currents in closed loops. The number of bars may vary according to manufacturing considerations, but each bar should have sufficient diameter to avoid excessive heating.

Since the rotating magnets 38 induce a changing magnetic field in the steel, steel ring 50 enhances the flow of eddy currents and therefore the torque applied from rotor 20 to rotor 18. At low slip (that is, slight relative rotation between rotors 18 and 20), copper bars 52 produce a torque between the rotors that is proportional to the slip. As the slip increases, the effect of steel ring 50 becomes more apparent, and the coupling is able to asynchronously operate under a greater load on the output shaft. Thus, the coupling 10 may be used in automotive or other systems in which overload, for example by braking, intermittently requires transmission of high torque.

As can be seen in the figures, the magnet surfaces at gap 44 exhibit an alternating polarity pattern. The alternating pattern may be continuous entirely about the input and output shaft axis, as in the embodiment of FIGS. 1–5, or may exist within magnet groups, as in the embodiments shown in FIGS. 6–8. Of course, the magnet groups of FIGS. 6–8 may be arranged so that the alternating magnet pattern continues from one group to the next.

Referring now to FIGS. 6 and 8, ceramic magnets 68 are disposed in magnet groups 60 and 64 so that each magnet is arranged in alternating polarity with respect to the circumferentially adjacent magnet(s) 68 and with respect to the radially opposite magnet 68 in the other magnet group to create alternating flux patterns 80. Again, the magnets within the magnet group may be considered to be an arrangement of U-shape magnets. In this case, each ceramic magnet 68 forms the U's cross member, while the steel members 72 form the side members. Thus, the magnet surfaces at gap 44 are formed by the soft magnetic side members 72 rather than the hard magnetic ceramic magnets 68. Within each magnet group 60 and 64, adjacent U-shaped magnets share a side member 72. Thus, each magnet group contains four U-shaped magnets.

A strong magnetic interaction exists between the opposing U-shaped magnets across gap 44, and the input and output shafts synchronously rotate as long as the output shaft load does not overcome the maximum torque that this interaction can bear. When this does occur, the output rotor slips with respect to the input rotor, and the magnet groups therefore rotate with respect to each other. This applies a changing magnetic field to the copper bars 74 in both magnet groups. The resulting eddy currents in the bars create magnetic drag which resists further relative rotation, thereby applying additional torque across the rotors and urging asynchronous rotation of the rotors. Thus, the coupling is able, through asynchronous operation, to accommodate a greater load on the output shaft than is possible during synchronous operation alone.

The operation of the embodiment illustrated in FIG. 7 is similar to that of FIG. 6. Here, each magnet group 60 and 64 includes two U-shaped magnets. Referring to magnet group 60, bottom plate 70 forms both cross members. Each steel section 72 forms one of the magnet's side members, while the rare earth magnet 78 forms the other. Thus, the two U-shaped magnets share the common side member formed by the rare earth magnet.

Magnet group 64 is a mirror image of magnet group 60, except that its rare earth magnet 78 exhibits an opposite polarity. Assuming a given polar orientation, a flux pattern 80 results.

Using the stronger rare earth magnets may allow the use of fewer magnets than the embodiment shown in FIG. 6 to maintain synchronous rotation up to the same rated load. When the torque limit is exceeded, the input and output rotors rotate with respect to each other. This applies a changing magnetic field to the copper bars 74 in both magnet groups, thereby generating eddy currents in the bars to create magnetic drag that resists relative rotation. Through this asynchronous coupling, the system is able to accommodate greater loads on the output shaft than would be possible with the synchronous coupling alone.

Any number of magnet groups as shown in FIGS. 6 and 7 may be disposed around their respective shaft as necessary to achieve a change from synchronous to asynchronous coupling at a desired load. Thus, for example, a continuous pattern of magnets may extend entirely around the rotors.

It should be understood that the dimensions and configurations of a given embodiment within the present invention will depend upon the needs of a particular system. For example, an asynchronous coupling may be desirable beyond a given load to avoid damage to the system. Thus, the coupling should be designed so that the magnetic interaction between the opposing rotor magnets provides this torque. Furthermore, while the embodiment illustrated in FIGS. 6–8 may be less expensive to manufacture, the embodiment illustrated in FIGS. 1–5 may provide an effective asynchronous coupling through greater slip rates. Once the synchronous torque limit is identified and the coupling geometry is selected, the particular dimensions and arrangement for a coupling (e.g. the number of magnets, the gap width and the magnet surface dimensions) may be determined through a finite element analysis as should be understood in this art.

While one or more preferred embodiments of the present invention have been described above, it should be understood that any and all equivalent realizations of the present invention are included within the scope and spirit thereof. For example, magnet groups as shown in FIGS. 6 and 7 may be disposed annularly about a pair of rotors as shown in FIG. 2 so that the opposing magnet groups face each other axially across the air gap. Similarly, the magnets and squirrel cage conductor arrangement as shown in FIG. 2 may be disposed on the outer and inner circumferential surfaces of the rotors as shown in FIG. 8. Additionally, the description above of the shafts as being the "input" shaft or the "output" shaft is for purposes of explanation, and it should be understood that either shaft may drive the other. Still further, it is possible to produce an embodiment of the invention by replacing a feature of one embodiment with that of another, or by adding a feature of one embodiment to another, or by adding or removing such features. For example, the arrangement of the magnets with the squirrel cage conductive member on the output rotor shown in FIG. 2 may be replaced by a squirrel cage conductive member alone in order to provide an asynchronous coupling. Thus, the embodiments depicted are presented by way of example only and are not intended as limitations upon the present invention. It should therefore be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed is:

1. A magnetic coupling, said coupling comprising:

a first shaft;

a plurality of first magnets in rotationally driving engagement with said first shaft and defining surfaces disposed in alternating polarity annularly about and concentrically with said first shaft;

a second shaft;

a plurality of second magnets in rotationally driving engagement with said second shaft and defining surfaces disposed in alternating polarity annularly about and concentrically with said second shaft, said second magnet surfaces being separated from said first magnet surfaces by a gap so that rotation of one of said first magnets and said second magnets about the axis of the respective said first shaft and said second shaft urges synchronous rotation of the other of said first magnets and said second magnets about the axis of the respective said first shaft and said second shaft; and an electrically conductive member in rotationally driving engagement with said second shaft, said conductive member disposed proximate to said surfaces of said first magnets so that rotation of one of said conductive member and said first magnets relative to the other of said conductive member and said first magnets induces electric current in said conductive member and urges asynchronous rotation of said other of said conductive member and said first magnets in the same rotational direction wherein said conductive member includes a first annular ring disposed concentrically with said second magnet surfaces, a second annular ring disposed concentrically with said first annular ring between said first annular ring and said second magnets, and at least one cross member electrically connecting said first annular ring and said second annular ring.

2. The magnetic coupling as in claim 1, wherein said first shaft is axially aligned with said second shaft and wherein said magnetic coupling includes a first rotor rotationally fixed to said first shaft and a second rotor rotationally fixed to said second shaft.

3. The magnetic coupling as in claim 2, wherein each of said first rotor and said second rotor includes a transverse face, wherein said first rotor transverse face is axially spaced from said second rotor transverse face with respect to the axis of said first shaft and said second shaft, and wherein said first magnets and said second magnets are respectively disposed on said first rotor and said second rotor so that said first magnet surfaces and said second magnet surfaces are axially spaced from each other by said gap.

4. The magnetic coupling as in claim 1, wherein said first magnet surfaces oppose both said second magnet surfaces and said conductive member directly across said gap.

5. The magnetic coupling as in claim 1, including a plurality of said cross members.

6. The magnetic coupling as in claim 5, wherein said cross members are disposed at said gap.

7. The magnetic coupling as in claim 1, wherein the conductive member comprises a non-magnetic material that becomes diamagnetic upon application of a changing magnetic field.

8. The magnetic coupling as in claim 7, wherein the non-magnetic material is copper.

9. The magnetic coupling as in claim 7, wherein the non-magnetic material is aluminum.

10. A magnetic coupling, said coupling comprising:

a first shaft;

a plurality of first magnets in rotationally driving engagement with said first shaft and defining surfaces disposed in alternating polarity annularly about and concentrically with said first shaft;

a second shaft;

a plurality of second magnets in rotationally driving engagement with said second shaft and defining surfaces disposed in alternating polarity annularly about and concentrically with said second shaft, said second magnet surfaces being separated from said first magnet surfaces by a gap so that rotation of one of said first magnets and said second magnets about the axis of the respective said first shaft and said second shaft urges synchronous rotation of the other of said first magnets and said second magnets about the axis of the respective said first shaft and said second shaft;

an electrically conductive member in rotationally driving engagement with said second shaft, said conductive member disposed proximate to said surfaces of said first magnets so that rotation of one of said conductive member and said first magnets relative to the other of said conductive member and said first magnets induces electric current in said conductive member and urges asynchronous rotation of said other of said conductive member and said first magnets in the same rotational direction, wherein said conductive member includes a first annular ring disposed concentrically with said second magnet surfaces, and a second annular ring disposed concentrically with said second magnet surfaces; and a third annular ring made of a soft magnetic material and disposed between said first annular ring and said second annular ring.

11. The magnetic coupling as in claim 10, wherein said soft magnetic material includes a plurality of channels in which a plurality of cross members electrically connecting said first annular ring and said second annular ring are disposed.

12. The magnetic coupling as in claim 11, wherein said channels open to said gap so that said cross members are exposed at said gap.

13. The magnetic coupling as in claim 10, wherein said soft magnetic material includes steel.

14. A magnetic coupling, said coupling comprising:

a first shaft;

a plurality of first permanent magnets in rotationally driving engagement with said first shaft and defining surfaces disposed in alternating polarity annularly about and concentrically with said first shaft;

a second shaft;

a plurality of second permanent magnets in rotationally driving engagement with said second shaft and defining surfaces disposed in alternating polarity annularly about and concentrically with said second shaft, said second magnet surfaces being separated from said first magnet surfaces radially by a gap so that rotation of one of said first magnets and said second magnets about the axis of the respective said first shaft and said second shaft urges synchronous rotation of the other of said first magnets and said second magnets about the axis of the respective said first shaft and said second shaft;

a plurality of first electrically conductive members in rotationally driving engagement with said first shaft, wherein respective said first conductive members are disposed between adjacent said first magnet surfaces of a plurality of pairs of said adjacent first magnet surfaces so that rotation of said first conductive members relative to said second magnets induces asynchronous rotation of said first conductive members and said second magnets in the same rotational direction; and a plurality of second electrically conductive members in rotationally driving engagement with said second shaft, wherein respective said second conductive members are disposed between adjacent said second magnet surfaces of a plurality of pairs of said adjacent second magnet surfaces so that rotation of said second conductive members relative to said first magnets induces asynchronous rotation of said second conductive members and said first magnets in the same rotational direction.

15. The magnetic coupling as in claim 14, wherein one of said first rotor and said second rotor includes an outer circumferential surface, wherein the other of said first rotor and said second rotor includes an enclosed inner circumferential surface spaced radially outward from said outer circumferential surface with respect to the axis of said first shaft and said second shaft, and wherein said first magnets and said second magnets are respectively disposed on said circumferential surfaces of said first rotor and said second rotor so that said first magnet surfaces and said second magnet surfaces are radially spaced from each other by said gap.

16. The magnetic coupling as in claim 14, wherein each said second magnet is generally U-shaped, having a cross member and two side members extending from said cross member, wherein each said side member defines a said second magnet surface at a distal end of said side member, and wherein a said conductive member is disposed between said side members.

17. The magnetic coupling as in claim 16, wherein said cross member is comprised of a hard magnetic material.

18. The magnetic coupling as in claim 17, wherein at least one said side member is comprised of a soft magnetic material.

19. The magnetic coupling as in claim 18, wherein said soft magnetic material is steel.

20. The magnetic coupling as in claim 17, wherein said cross-member includes a ceramic magnet.

21. The magnetic coupling as in claim 16, wherein a group of said second magnets is disposed so that adjacent said second magnets of said group share a common said side member.

22. The magnetic coupling as in claim 21, including a plurality of said groups in spaced apart relation about the axis of said second shaft.

23. The magnetic coupling as in claim 16, wherein at least one of said side members is comprised of a hard magnetic material.

24. The magnetic coupling as in claim 23, wherein said cross member is comprised of a soft magnetic material.

25. The magnetic coupling as in claim 23, wherein one of said side members is comprised of said hard magnetic material and the other of said side members is comprised of a soft magnetic material.

26. The magnet as in claim 23, wherein said at least one side member includes a rare earth magnet.

27. A magnetic coupling, said coupling comprising:
   a first shaft;
   a plurality of magnets in rotationally driving engagement with said first shaft and defining surfaces disposed in alternating polarity annularly about and concentrically with said first shaft;
   a second shaft; and
   an electrically conductive member in rotationally driving engagement with said second shaft, said conductive member disposed proximate to said surfaces of said magnets so that rotation of one of said conductive member and said magnets relative to the other of said conductive member and said magnets induces electric current in said conductive member and urges asynchronous rotation of said other of said conductive member and said magnets in the same rotational direction,
   wherein said conductive member includes
      a first annular ring disposed concentrically with said second shaft,
      a second annular ring disposed concentrically with said first annular ring between said first annular ring and said magnets, and
      a plurality of cross members electrically connecting said first annular ring and said second annular ring.

28. The magnetic coupling as in claim 27, including a soft magnetic material disposed between said first annular ring and said second annular ring, wherein said soft magnetic material includes a plurality of channels in which respective said cross members are disposed.

29. The magnetic coupling as in claim 22, wherein said channels open to said gap so that said cross members are exposed at said gap.

30. A magnetic coupling, said coupling comprising:
   a first shaft;
   a first rotor in rotationally driving engagement with said first shaft;
   a plurality of first magnets disposed on said first rotor and defining surfaces disposed in alternating polarity annularly about and concentrically with said first shaft;
   a second shaft;
   a second rotor in rotationally driving engagement with said second shaft;
   a plurality of second magnets disposed on said second rotor and defining surfaces disposed in alternating polarity annularly about and concentrically with said second shaft, said second magnet surfaces being separated from said first magnet surfaces by a gap so that rotation of one of said first rotor and said second rotor about the axis of the respective said first shaft and said second shaft urges synchronous rotation of the other of said first rotor and said second rotor about the axis of the respective said first shaft and said second shaft;
   a first electrically conductive annular ring disposed on said second rotor concentrically with said second magnets and proximate to said surfaces of said first magnets so that rotation of one of said first rotor and said second rotor relative to the other of said first rotor and said second rotor induces electric current in said annular ring and urges asynchronous rotation of said other of said first rotor and said second rotor in the same rotational direction;
   a second said annular ring disposed on said second rotor concentrically with said first annular ring between said first annular ring and said second magnets; and
   a plurality of cross-members electrically connecting said first annular ring and said second annular ring.

31. The magnetic coupling as in claim 28, wherein said cross members are disposed at said gap.

32. The magnetic coupling as in claim 28, including a soft magnetic material disposed between said annular ring and said second annular ring.

33. The magnetic coupling as in claim 32, wherein said soft magnetic material includes a plurality of channels in which said cross members are disposed.

34. The magnetic coupling as in claim 33, wherein said channels open to said gap so that said cross members are exposed at said gap.

35. A magnetic coupling, said coupling comprising:
   a first shaft;
   a first rotor in rotationally driving engagement with said first shaft;
   a plurality of first permanent magnets disposed on said first rotor and defining surfaces disposed in alternating polarity annularly about and concentrically with said first shaft;
   a second shaft;
   a second rotor in rotationally driving engagement with said second shaft;
   a plurality of second permanent magnets disposed on said second rotor radially outward of said first magnets and defining surfaces disposed in alternating polarity annularly about and concentrically with said second shaft, said second magnet surfaces being separated from said first magnet surfaces by a gap so that rotation of one of said first rotor and said second rotor about the axis of the respective said first shaft and said second shaft urges synchronous rotation of the other of said first rotor and said second rotor about the axis of the respective said first shaft and said second shaft;

a plurality of first electrically conductive members disposed on said first rotor between adjacent said first magnet surfaces of a plurality of pairs of said adjacent first magnet surfaces and proximate to said second magnet surfaces so that rotation of one of said first rotor and said second rotor relative to the other of said first rotor and said second rotor induces electric current in said first conductive members and urges asynchronous rotation of said other of said first rotor and said second rotor in the same rotational direction; and a plurality of second electrically conductive members, respective said second conductive members disposed on said second rotor between adjacent said second magnet surfaces of a plurality of pairs of said adjacent second magnet surfaces and proximate to said surfaces of said first magnets so that rotation of one of said first rotor and said second rotor relative to the other of said first rotor and said second rotor induces electric current in said second conductive members and urges asynchronous rotation of said other of said first rotor and said second rotor in the same rotational direction.

36. The magnetic coupling as in claim 35, wherein each said second magnet is generally U-shaped, having a cross member and two side members extending from said cross member, wherein each said side member defines a said second magnet surface at a distal end of said side member, and wherein a said second conductive member is disposed between said side members.

37. The magnetic coupling as in claim 36, wherein said cross member is comprised of a hard magnetic material.

38. The magnetic coupling as in claim 37, wherein at least one said side member is comprised of a soft magnetic material.

39. The magnetic coupling as in claim 36, wherein a group of said second magnets is disposed so that adjacent said second magnets of said group share a common said side member.

40. The magnetic coupling as in claim 36, wherein at least one of said side members is comprised of a hard magnetic material.

41. The magnetic coupling as in claim 40, wherein one of said side members is comprised of said hard magnetic material and the other of said side members is comprised of a soft magnetic material.

42. A magnetic coupling, said coupling comprising:

a first shaft;

a first rotor in rotationally driving engagement with said first shaft;

a plurality of first magnets disposed on said first rotor and defining surfaces disposed in alternating polarity annularly about and concentrically with said first shaft;

a second shaft;

a second rotor in rotationally driving engagement with said second shaft;

a plurality of second magnets disposed on said second rotor and defining surfaces disposed in alternating polarity annularly about and concentrically with said second shaft, said second magnet surfaces being separated from said first magnet surfaces by a gap so that rotation of one of said first rotor and said second rotor about the axis of the respective said first shaft and said second shaft urges synchronous rotation of the other of said first rotor and said second rotor about the axis of the respective said first shaft and said second shaft;

an electrically conductive member disposed on said second rotor concentrically with said second magnets and proximate to said surfaces of said first magnets so that rotation of one of said first rotor and said second rotor relative to the other of said first rotor and said second rotor induces electric current in said conductive and urges asynchronous rotation of said other of said first rotor and said second rotor in the same rotational direction, said electrically conductive member including a first annular ring, a second annular ring, and a plurality of cross members electrically connecting said first annular ring and said second annular ring; and a soft magnetic material disposed between said first annular ring and said second annular ring and defining channels therein in which said cross members are disposed, said channels being open to said gap so that said cross members are exposed at said gap, wherein said first magnet surfaces oppose both said second magnet surfaces and said cross members directly across said gap.

* * * * *